United States Patent [19]

Ray et al.

[11] Patent Number: 4,909,845

[45] Date of Patent: Mar. 20, 1990

[54] MINE SEALANT COMPOSITION

[76] Inventors: Charles E. Ray, 480 Meadow Rd., Grand Junction, Colo. 81504; Joseph P. Smith, P.O. Box 665, Benton, Ill. 62812; Carl R. Cribari, 225 30½ Rd., Grand Junction, Colo. 81503; James L. Riddle, 2919½ Sandra, Grand Junction, Colo. 81504

[21] Appl. No.: 222,964

[22] Filed: Jul. 22, 1988

[51] Int. Cl.$^4$ ............................................. C09K 21/02
[52] U.S. Cl. ................................... 106/18.12; 106/74; 106/80; 106/84
[58] Field of Search .................... 106/18.11, 18.12, 74, 106/80, 84

[56] References Cited

U.S. PATENT DOCUMENTS

| | | | |
|---|---|---|---|
| 3,823,019 | 7/1974 | Dale | 106/15 |
| 4,066,463 | 1/1978 | Antoine | 106/15 |
| 4,168,175 | 9/1979 | Shutt | 106/15 |
| 4,179,535 | 12/1979 | Kalbskopf | 427/206 |
| 4,277,355 | 7/1981 | Farcnik | 252/62 |
| 4,338,374 | 7/1982 | Neser | 428/411 |
| 4,347,285 | 8/1982 | Batdorf | 106/84 |
| 4,376,674 | 3/1983 | Ali | 162/136 |
| 4,419,256 | 12/1983 | Loomis | 252/62 |
| 4,443,258 | 4/1984 | Kirkhuff | 106/18 |
| 4,600,560 | 7/1986 | Vallak | 106/DIG. 2 |

OTHER PUBLICATIONS

The composition (by assignee's predecessor company) discussed on pp. 11, 12 and 13 of the patent application and in the "Information Disclosure Statement" filed with this patent application.

Primary Examiner—Theodore Morris
Attorney, Agent, or Firm—Dorr, Carson, Sloan & Peterson

[57] ABSTRACT

Sprayable, pre-mixed, mine sealant compositions having enhanced strength properties and capable of retarding flame propagation and suppressing combustibility of substrate materials are disclosed in three general forms. In the first form, an alkaline silicate material such as sodium silicate is employed with perlite and a mineral acid in order to provide the above properties. In a second formulation, the first form is augmented by white pigments. In a third formulation, additional bulking materials e.g., cellulose are added to provide enhanced structural integrity and mine sealant qualities.

11 Claims, No Drawings

MINE SEALANT COMPOSITION

FIELD OF THE INVENTION

This invention relates generally to mine wall sealant compositions. More specifically it relates to sprayable mine wall sealant compositions employing alkali metal silicate ingredients.

BACKGROUND OF THE INVENTION

Under current underground mining engineering practices, mine passageways such as portals, adits, drifts, inclines and shafts are constructed to follow the course of mineral veins and to provide access for men and machinery so that they can penetrate, detach an convey mineral bearing materials to external processing facilities. Such activities do however produce several major safety concerns. First and foremost is the fact that, as raw passageways are opened, there usually must be erected some sort of ceiling to prevent the fall of loose material on to personnel and/or equipment working below. These ceilings are often supported by vertical strength members of sufficient strength to support a ceiling and/or the roof of the raw pasageway itself. Such passageways are then very often given a coating of a mine sealant material. These mine construction procedures generally result in passageways having a tube-like character. Ideally, such tubes should at least have enough structural integrity to aid in resising the fall of loose material from the roof and/or incursions of loose materials from the sides of such passageways. It should be noted at this point that the expressions "roof", "ceiling", and "wall(s)" may be used somewhat loosely and even intechangeably in the context of describing theee tube-like structures to denote their tops, sides etc.

These tube-like passageways also sometimes serve to channel mine water drainage in desired directions. Obviously, they also serve as convenient distribution channels for the electrical, compressed air, and/or hydraulic fluid lines needed for mining operations. In any event, these tube-like structures are usually completed by covering their surfaces with a mine sealant coating and then providing them with utilities for carrying on further construction activities; not the least of which is the provision of an air supply capable of supporting human life.

Concern for the air supply often make it necessary to line the roofs and walls of the tube for the specific purpose of preventing dissipation of the air supply. In other words, in the absence of a mine sealant coating, the air demand might tend to become insatiable as the mine grows more and more extensive and complex and as more and more points of air leakage have the opportunity to develop. Use of such mine sealant coatings in these tubes also serves to keep out mine gases that would otherwise intrude into the mine's atmosphere as these gases are often present, or formed, as mining operations progress. Concern for the quality of a mine's air supply also often dictates that a tube be "compartmentalized" by placement of air tight walls at selected places across openings formed by particular mine tub sections.

These tubes and the partitions used to compartentalize them are often constructed from cinder blocks, jute brattices, and timbers. These materials are usually selected for their ease of assembly, relative light weight, strength and low cost. Such construction materials (especially timber and jute) are however often flammable. Moreover, the finishes provided by these materials (e.g., jute brattices) are not usually "air tight". It should also be noted that raw cut mine walls usually have untold numbers of interstices and other irregularities which may detract from their structural integrity. Hence, it is usually necessary to provide them with an internal surface material which can fill, seal and smooth the walls and intersections of various mine architecture elements as well as any interstices and irregularities in the mine's walls, roof, etc.

Ideally, such an internal surface sealant material should have sufficient body to: (1) even out wall irregularities and interstices, (2) seal the tube against undue air supply losses and mine gas incursions as well as serve to channel the mine's air supply toward desired areas, (3) at least assist in preserving the structural integrity of the tube system and, ideally, also (4) serve to suppress flame propagation of wall and mine architecture materials in case of fire and (5) provide a high reflectivity of light in order to conserve illumination within a mine for reasons of safety and improved working conditions.

Many of the most wddely used mine wall sealant compositions use cementitious materials or sulfur as their basic ingredients. However, miners have found that the use of either of these two types of mine sealants presents certain problems and drawbacks. For example, cementitious materials must be mixed on site. This requires a water supply, specialized mixing equipment and utilities at the point where the sealant is being mixed and applied. Ideally, mine sealant materials should be sprayable because hand application is expensive, time consuming and tiiing. However, miners have found that if cementitious materials are diluted to a point where they are sprayable, they do not set up quickly and/or the resulting mine sealant coatings lack structural integrity when they do set up. Consequently most cementitious mine sealants are in fact applied at a very thick, unsprayable consistency by use of hand trowels.

Sulfur based mine sealants have overcome some of he drawbacks associated with cementitious sealants because many sulfur based mine sealants can in fact be supplied to the miner in a sprayable form. They also set up with an acceptable degree of structural integrity. Hence several sprayable, plasticized sulfur coating compositions have been employed for coating mine walls in order to both strengthen the overall structural integrity of the tube and/or to reduce the passage of gases and fluids through a mine's walls, roof and architecture. Such compositions are generally composed of sulfur, a liquid polysulfide polymer and glass fibers from about one quarter to one half inch in length. These compositions do have certain drawbacks however. For example, they are sometimes difficult to apply with certain kinds of spray equipment because their glass fiber ingredients tend to clog many spray nozzles commonly employed in spraying operations. Unfortunately, these materials have to be mixed and aged on site. This is perhaps their greatest drawback. They also exhibit a certain tendency to drip and run from mining wall surfaces if they are diluted enough to be more readily sprayed. Consequently, in practice, many sulfur based mine sealants are also applied with a trowel. Moreover, many sulfur based mine sealants are rather expensive and they tend to give off objectionable odors and/or are iirritating to the eyes.

In response to these problems, other sulfur based compositions containing elemental sulfur, dicyclopentadiene, glass fiber and talc have been introduced. These compositions have proven to be more readily applied to mine walls by spraying than the prior art compositions; they also possess better adhesion qualities over prior art sealants. This attribute has improved the structural integrity and gas imperviousness of the tube and/or raw cut mine walls. In addition, these elemental sulfur compositions exhibit better flame-resistant qualities than most of those of the prior art. They also tend to produce less objectionable odors and they are not nearly as irritating to the eyes. Consequently many present day mine wall coating compositions are compounded from a variety of mixtures of elemental sulfur, dicyclopentadiene, glass fiber and talc mixtures. These elemental sulfur compositions are usually applied to mine walls by spraying a molten mixture of these compositions, preferably at elevated temperatures.

Unfortunately, these compositions also have to be "aged" at elevated temperatures (e.g., 240° to 320° F.) e.g., from about 24 hours to about 48 hours, prior to spraying in order to permit a reaction between the elemental sulfur and the dicyclopentadiene. These elemental sulfur compositions have some other drawbacks as well. For example they often have to be applied to the mine walls at elevated temperatures. Obviously, the equipment needed to produce such elevated temperatures, especially in the context of mining operations, is both expensive and potentially hazardous. Hence it would be of considerable advantage to have other mine sealant compositions which do not require either a heating step as a condition for mixing and/or a long aging period after preparation, but before application. If an alternative material to either cement or sulfur based mine sealants also provided increase structural integrity to the tube upon setting up, and were less costly, so much the better.

Mine wall sealants based upon the use of alkaline metal base ingredients have been suggested as alternative mine sealants. This follows chiefly from the fact that alkali metal ingredients have been used to provide flame-retarding qualities to flammable construction materials employed in non-mining applications. Some of the more common alkali metal based flame retardants are taught in various patent disclosures hereinafter discussed. For example, U.S. Pat. No. 4,179,535 teaches a fire retardant coating made from hydrated metal silicate particles and an aqueous alkali metal silicate solution. A typical coating would comprise sodium silicate and silicon dioxide in a ratio of from about 2 to about 3.5, with the remainder of the coating being comprised of water. However, these alkali metal solutions of this type must be quickly applied as a slurry before any significant absorption of water takes place. Such solution have other drawbacks as well. For example, upon heating, the coatings formed by these materials expand to form a foam and hence they tend to loose any structural integrity they may have had as a hard coating or sealant. In other words they would loose their structural integrity at a time when it was needed most—in the event of fire in a mine.

By way of further example, U.S. Pat. No. 4,066,463 teaches a flame-resistant composition comprising: (a) 20 to 50 weight percent of an aqueous alkali metal silicate solution such as sodium silicate, (b) 5-25 weight percent of a clay such as Kaolin, (c) 2-7 weight percent of deflocculated asbestos fibers, and (d) an organic component such as carboxyl methylcellulose.

U.S. Pat. No. 4,168,175 teaches a fire retardant composition comprised of an admixture of ammonium phosphate, sodium tetraborate containing molecularly bound water and finely ground soda-containing silicate glass for imparting fire retarding property to cellulosic materials.

U.S. Pat. No. 4,277,355 teaches a fireproof coating comprising a non-porous filler e.g., silica flour (or calcium carbonate) dispersed in a water carrier along with a thermo-insulating, porous particulate filler such as slag cinder or lava rock. Alkali metal silicates are employed as a binder.

U.S. Pat. No. 4,338,374 teaches a fireproofing coating made from an alkali metal silicate soluion (e.g., sodium silicate) containing a non-ionic surfactant (e.g., urea, hexamethylenetetramine oorax etc.) in combination an alkali metal tri-silicate (sodium trisiliciate powder).

U.S. Pat. No. 4,376,674 teaches use of flame resistant panels prepared by treating the surface of water-laid fiber mats with an aqueous slurry of sodium silicate and calcium carbonate. The mats are then dried in a prescribed manner.

U.S. Pat. No. 4,419,256 teaches a sprayable building insulation composition comprising a blended mixture of cellulose fiber, mineral wool and expanded silicate glass.

U.S. Pat. No. 4,443,258 discloses a fire retardant material comprised of an unexpended form of perlite associated with a permeable mass of silica glass. Upon exposure to combustion temperatures, the perlite expands from its unexpended form to its expanded form. When exposed to heat, the perlite and glass react to form a flame-impenetrable eramic material.

Such flame-retardant compositions have not, however, for various reasons, proved to be useful as mine sealant materials. This lack of utility usually follows from the fact that those sodium silicate based materials which may be effective air and gas sealants usually must be mixed with a water carrier, on site, where water may be unavailable. They also tend to become very thick so quickly that they become unsprayable. Hence when used, they too generally would have to be applied with a trowel. As previously noted, hand trowel work is slow, expensive, tiring and tedious.

On the other hand, attempts to "thin" such sodium silicate compositions have produced sealant materials which are sprayable, but which also have to be mixed on site and which also tend to dry much too slowly for use in most mining operations. In fact many sodium silicate solutions simply refuse to set up in a hard form in the damp, cold atmosphere usually extant in underground mines. Hence, they provide little or no structural integrity to the tube.

One such sprayable, fire-retardant sodium silicate material, used by a predecessor to applicants' assignee company, was formulated by preparing a two part formulation. The first part of that formulation was prepared by taking sodium silicate and vigorously mixing it with hot water so that the sodium silicate went into solution. To this first solution a fine perlite was added with agitation under heat (110° F.) for one and one half hours. The resulting solution was then cooled to 85°–90° F. A second part of that formulation was prepared by mixing activated silica with a wetting agent. This second part of the formulation was then allowed to stand for 12 hours. The first part and the second part of that formulation were then added together under agitation. Finally, chromium trioxide was added to the mixture as a catalyst. The resulting formulation was in fact sprayable; nevertheless, it proved to be unacceptable to the mining industry for a number of other reasons. Not the least of these was the fact that, under the usual damp and cold conditions encountered in many mine, that formulations also required unacceptably long times (48 hours or more) to dry. Under colder conditions (less than about 40° F.) that formulation sometimes completely refused to set up in the hard form needed to aid in augmenting the structural integrity of a mine tube.

SUMMARY OF THE INVENTION

The compositions of this patent disclosure are a group of alkaline silicate based materials which are capable of better fulfilling the need for sprayable, pre-mixed, mine sealants. Our compositions are chiefly characterized by the fact that they (1) are easily sprayable, (2) do not require on site mixing, (3) do not require elevated temperatures for spray application, or (4) do not require long drying or aging times. Moreover, the dried forms of our mine sealant compositions are gas impermeable and, most importantly, when dry, they are strong enough to significantly add to the overall structural integrity of the mine tube or mine wall partitions to which they are sprayed.

The fundamental ingredient of our mine sealant compositions is an alkaline silicate; and as was the case with many of the flame retardant compositions previously noted, sodium silicate is a preferred form of alkaline silicate in our mine sealant formulations since its use may make for mine sealants having somewhat greater structural integrity. Sodium silicate also tends to be less expensive than some of the other alkaline silicates. The basic alkaline silicate ingredient of our formulations must, however, be supplemented by certain other ingredients, in certain proportions, before an effective, sprayable, pre-mixed, fast drying mine sealant composition is created.

The alkaline silicate compositions disclosed herein preferrably should be supplemented by both perlite and a mineral acid such as sulfuric acid, hydrochloric acid and the like. It is believed that such a mineral acid, aside from serving to adjust the pH of the composition, serves to better stabilize the silicate. Water is an optional ingredient in our formulations. It can be used over a fairly wide range of proportions which are hereinafter more fully discussed. Limestone (calcium carbonate) and/or talc also can be added to certain versions of the herein disclosed formulations as optional ingredients. The calcium carbonate and/or talc ingredient is used primarily as a surfactant. Similarly, and also as an additional optional ingredient, cellulose can be employed to provide additional bulking and small-pore sealant properties. Finally, and also as an optional ingredient, white or other light colored pigments such as titanium dioxide, chalk etc., may be employed to impart a light color to our formulations and hence serve to conserve illumination and aid visibility within the mine under whatever artificial light is available. Titanium dioxide is highly preferred for this purpose because it has a very high index of refractivity; it also is inert to most commonly encountered mine gases.

Some of the ingredient ranges of our formulations are quite wide while others are much more narrow. One example of a relatively narrow range is that of the mineral acid. Applicants have found that mineral acid concentrations above about 2.00 percent by weight tend to cause some very undesirable gel reactions in most of the formulations f this patent disclosure. It should also be noted that while workable formulations can be obtained even at the extremities of the hereinafter disclosed ingredient ranges (e.g., those for sodium silicate, water, etc.), the characteristics of the end products made at the extremes of the ingredient ranges do not produce the most preferred forms of our mine sealants. Generally speaking, products mixed within plus or minus ten percent, by weight, of the ingredient ranges for the preferred formulations A, C and D, hereinafter noted in the "Description of the Preferred Embodiments" section of this patent disclosure, tend to give the best all around results under most conditions encountered in most mine wall coating operations.

The formulations of this invention are of three main types which Applicants have designated: Formulation A, Formulation C and Formulation D. Formulation A is comprised of, on a weight basis (all percentages noted i this patent application are by weight unless otherwise noted), from about 40 to about 95 percent of an alkaline silicate such as sodium silicate, from about 0.05 to about 4.00 percent perlite and from about 0.005 to about 2.00 percent of a mineral acid. Sulfuric acid and hydrochloric acid are particularly well suited mineral acids for our purposes. Formulation A can be used as a mine sealant in its own right, or it may be used as a starting composition from which Formulation C or Formulation D may be prepared.

Formulation C, is a highly preferred form of our mine sealant in situations where added structural integrity are of paramount importance. Preferably, it should contain, on a weight percentage basis, from about 40.00 to about 90.00 percent of an alkaline metal silicate (again, sodium silicate is preferred), from about 0.05 to about 20.00 perlite, from about 0.005 to about 2.00 mineral acid, from about 1.000 to about 25.00 percent calcium carbonate, from about 1 to about 10 percent cellulose and from about 0.1 to about 15.00 percent of a light colored pigment such as titanium dioxide, chalk, etc.

Formulation D is a particularly preferred sealant and flame retardant for wooden mine architecture members. Its alkaline silicate component will comprise from about 30 to about 95 weight percent of the formulation. Perlite will represent from 0.01 to about 20.00 percent of its weight. A mineral acid will comprise from about 0.005 to about 2.00 percent of its weight and a white pigment, such as titanium dioxide will account for from about 5.00 to about 15.00 weight percent of our Formulation D composition.

Again, water is an optional ingredient in Formulations A, C and D. Its concentration can vary rather widely, from say about 1.00 percent up to as much as 50.00 percent by weight. The sodium silicate and water, if any is employed, provide the liquid quality of our formulations. Hence liquidity and thus the "sprayability" of our formulations is often best adjusted by variation in water content, rather than variation in the liquid sodium silicate content, if for no other reason than that of cost.

Be that as it may, the formulations of this invention can be mixed by common agitation of the ingredients, which can be admixed in any order of introduction. There are however some preferred mixing and formulation techniques which can be employed for the formulations of this patent disclosure. The method of blending or mixing the various components of these formulations, especially Formulation "C", can influence some of the characteristics of the end product, e.g., they can influence consistency, and hence sprayability. By wy of example, one preferred mixing procedure is as follows: first, combine the sodium silicate and water, then begin slow agitation. While agitating, add the perlite. It is also preferred to heat this mixture to no less than about 95° F. and no greater than about 150° F. while agitaing continuously. Once the mixture has attained the desired temperature, the mineral acid is added and agitation is continued for fifteen minutes, or until the mixture is completely blended. A further point regarding mixing is that since the sodium silicate ingredient may give Formulation A a basic pH which may interfere to some extent with the introduction of other ingredients, the mineral acid is preferably added as a step prior to the introduction of those other ingredients e.g., the cellulose, the white pigment, etc., which produce Formulation C or Formulation D from Formulation A.

For Formulation C, Applicant prefers to add the dry ingredients such as calcium carbonate or talc and the white pigment to a liquid mixture, and, as the last step, add the cellulose. In one preferred embodiment of this invention, the cellulose may be introduced in the form of untreated, finely ground newsprint. In most cases, the dry ingredients except cellulose are added to a liquid mixture. The mixer is then turned on and the cellulose is then added, preferably by a blowing action. Applicant has found that by blowing said cellulose ingredient, as opposed to simply dumping it into the formulation, an improved texture of the finished product is obtained.

Again, most preferably Formulation C and Formulation D are prepared from Formulation A. In other words, Formulation A represents a convenient liquid base to which various additional ingredients may be added to make Formulation C or Formulation D. Thus for example, Formulation D can be produced by adding a light colored pigment such as a white pigment (e.g., titanium dioxide, chalk etc.) to Formulation A. It should also be pointed out that the mixing procedures carried out during the manufacturing process may be somewhat influenced by temperature conditions at mixing. Again, temperatures of from about 95° F. to about 150° F. are preferred for mixing the sodium silicate, water and perlite to produce Formulation A. Variations in temperature conditions can of course effect the quantities of a given ingredient which will go into solution.

By way of a more specific example, about 18.77 percent by weight of water and about 4.3 percent by weight of titanium dioxide or chalk can be added, under agitation, to Formulation A to produce Formulation D, a sprayable liquid mine sealant and fire-retardant coating which is especially useful for sealing and otherwise coating wooden elements used in mine architecture. Similarly, Formulation C can be produced by adding cellllose, calcium carbonate (and/or talc) and a light colored pigment to Formulation A. I should also be noted that in producing Formulation C, the calcium carbonate (and/or talc) titanium dioxide, cellulose and, optionally, water are most conveniently added together with mixing until the cellulose is totally absorbed into liquid. This mixing process may take from about 30 minutes up to about an hour. The results are mine sealant compositions which remain pre-mixed for very long periods of time and generally require no on site mixing whatsoever.

The compositions of this invention are specifically adapted to be applied as a sprayable pre-mixed fluid mixture. Thus these compositions should be homogeneous mixtures of their ingredients at the time they are sprayed. Again, a mixing procedure is however only required as part of the manufacturing process for these compositions. On site mixing just prior to application is not normally required unless the compositions have been stored for extremely long periods of time (many months) before they are used. For example Formulations A and C require no on site mixing even after many months of storage. On the other hand, Formulation D may require some mixing after a few weeks of storage chiefly for the purpose of remixing the white pigment which does have a tendency to separate in Formulation D over long periods of storage time. As previously noted, the on site presentation of a pre-mixed formulation is of great practical advantage because the miner usually need only open the container holding our formulations and simply start using them. Obviously this feature is of particular advantage in the context of working in a confined underground mine.

Application temperatures above about 40° F. are preferred since such temperatures produce better spraying and curing qualities. Spray temperatures at about 60° F. are even more preferred if they are attainable. However, Applicants have found that Formulations A, C and D can be sprayed at temperatures as low as about 0° F. This is not a preferred procedure however since under these conditions our formulations may freeze before they have a chance to cure.

Any conventional vessel may be used for holding the composition in a manner suitable for spray application. Containers having openings for receiving hoses through which these formulations can be sucked into spray equipment are particularly useful. In most cases however they are simply dumped into the hopper of the spray machine used to apply these formulations. Use of such spray machines is preferred but application of these compositions may be by any means capable of applying a layer of a formulation to a suitable thickness. For sealing mine walls, a layer of a thickness of about 1/16 inch to $\frac{1}{4}$ inch is generally preferred. For Formulation C, the sealant thickness will preferrably range from about $\frac{1}{8}$ inch t about $1\frac{1}{8}$ inch. It should be noted in passing that a $1\frac{1}{8}$ inch coating thickness of coating aluminum overcasts may be required to meet certain mine safety regulations. Most other applications generally will require no greater than about a $\frac{1}{8}$ inch sealant thickness. Such thicknesses are generally less than those required for other types of mine sealant materials (e.g. cementitious and sulfur based mine sealant materials) and hence the use of such reduced thicknesses can result in cost reductions in terms of time savings as well as reduced costs of materials.

Use of Formulations A and D generally permit a sealing based upon a single coat application. This usually results in a coating thickness which is usually in the range of from about 1/64 inch to about 1/16 inch, depending on the method of application and absorption by the surface being coated. It should also be noted that a significant contribution is made by the thixotropic rheology of Formulation D as it is normally sprayed on in a coating thicknesses of up to about 1/16 of an inch. Generally a thickness of greater than about $\frac{1}{8}$ of an inch would not normally be required for Formulation D.

Application of our formulations is usually most conveniently accomplished by means of spray coating techniques, using any apparatus capable of providing a relatively uniform coating of these compositions to a desired thickness. An airless spraying system, capable of delivering a fan-shaped spray, has been found to be very satisfactory for applying our formulations. It should also be noted that the use of spray nozzles that create such spray pattern, but do not overly atomize the coating compositions, are preferred. The use of atomizing air sprayers such as those employed in conventional paint spray operations is undesirable because of the vapors and mist they tend to create in the mine's atmosphere. Those skilled in mining operations will appreciate that the presence of such vapors imply stricter safety measures with respect to respirators, masks, protective clothing and the like.

In any event, the pressures employed to spray the formulations of this patent disclosure can vary a great deal according to local conditions at the mine. The distance from the spray nozzle to the surface being coated is one of the more important variables. By way of example, Applicant has found that pressures of about 250 psi at a spray wand produce acceptable sprays at distances of from about 2 feet to about 50 feet formmost of the compositions of this patient disclosure.

DESCRIPTION OF THE PREFERRED EMBODIMENTS

The following tables establish the ingredient proportions of Formulations A, C and D respectively. Examples of some particularly preferred formulations are also given.

| Ingredient Ranges for Type "A" Formulation (mineral acid) | |
|---|---|
| Components | Range of Parts By Weight Percent |
| Sodium Silicate | 40.00-95.00 |
| Perlite | 0.05-4.00 |
| Mineral Acid | 0.005-2.00 |

| Preferred Type "A" Formulation | |
|---|---|
| Components | Range of Parts By Weight Percent |
| Sodium Silicate | 77.0000 |
| Water | 22.7301 |
| Perlite | 0.2603 |
| Sulfuric Acid | 0.0096 |
| | 100.0000 |

| Ingredient Ranges for Type "C" Formulations | |
|---|---|
| Components | Range of Parts By Weight Percent |
| Sodium Silicate | 40.00-90.00 |
| Perlite | 0.05-20.00 |
| Sulfuric Acid | 0.005-2.00 |
| Calcium Carbonate (or talc) | 1.000-25.00 |
| White Pigment (e.g., TiO$_2$) | 0.1-15.00 |
| Cellulose | 1.0-10.00 |

| Preferred Type "C" Formulation | |
|---|---|
| Components | Range of Parts By Weight Percent |
| Sodium Silicate | 67.4426 |
| Water | 22.7130 |
| Perlite | 0.5592 |
| Sulfuric Acid | 0.0105 |
| Calcium Carbonate | 3.1855 |
| White Pigment | 0.8133 |
| Cellulose | 5.2759 |
| | 100.0000 |

| Ingredient Ranges for Type "D" Formulations | |
|---|---|
| Components | Range of Parts By Weight Percent |
| Sodium Silicate | 30.00-95.00 |
| Perlite | 0.01-20.00 |
| Mineral Acid | 0.005-2.00 |
| White Pigment (TiO$_2$) | 5.00-15.00 |

| Preferred Type "D" Formulations | |
|---|---|
| Components | Range of Parts By Weight Percent |
| Sodium Silicate | 55.817 |
| Water | 39.3313 |
| Perlite | 0.4882 |
| Sulfuric Acid | 0.0024 |
| White Pigment (e.g., TiO$_2$) | 4.3064 |

Formulations whose ingredients remain within about plus or minus ten percent of the above noted "preferred" formulations will generally give the best overall results for the mine sealant formulations of this patent disclosure. Thus for example, a Formulation A composition having plus or minus about 7.7 percent of the 77 weight percentage for the sodium silicate ingredient (i.e. from about 69.3 to about 84.7 percent) will generally give the best results. The other ingredient concentrations can each be varied in a similar manner.

STRENGTH AND FIRE RETARDANCY TESTS

Various strength tests wer conducted on the mine sealants of this patent disclosure. Many of them were carried out according to ASTM Standard E72-80. The overall test results (see Table I) indicate that dry stacked concrete block panels and walls coated with representative formulations of the herein disclosed mine sealants exhibit flexural strength characteristics greater than those of similar block structures laid with mortar. This virtue is particularly important in the context of establishing additional strength in mine shaft walls and tube linings since these structures are subjected to flexural stresses in the form of "buckling" and "bowing" which usually represent the principal reason for mine wall failures.

For example, tests conducted with respect to flexural strength properties of dry-stacked concrete block walls coated with Formulation C in accordance with the procedures oullines in the American Society for Testing and Materials (ASTM) standard ASTM E72-80, "Conducting Strength Tests of Panels for Building Construction" indicate that dry-stacked concrete block walls coated with Formulation C mine sealant exhibit average flexural strength characteristics greater than the flexural strength of a similar block structure laid with mortar. Hence, walls constructed of nominal 6-inch masonyy block, or larger, stacked dry and coated on each side with ⅛ inch of Formulation C mine sealant may be used in lieu of conventional mortared walls in surface and underground mining applications. It follows then that use of this construction technique will save a great deal of labor.

As part of these tests, wall structures were made of standard 8" concrete blocks. These blocks were laid on top of each other and a layer of Formulation C sealant was applied on each side of the panel. Three (3) 4'×8' panels were constructed with ⅛" thick material on either side and one (1) panel with ¼" thick material on either side. The panels were built on 8" wide wood pallets with spaces on bottom so the panels could be lifted for testing. The test frame was set so one side was connected together. The 4'×8' block panel was than placed against one side of the test frame. The top and bottom supports were 6" wide. This load frame was supported by an overhead crane. A 30 ton-jack was calibrated prior to testing and was placed at the center of the front loading frame. The space between the load cell and the rear bearing frame was filled with spacers the other side of the test was connected together. The load was then applied through the jack and the maximum pressure recorded according to ASTM E-72.

The load as indicated was taken from the pressure gauge on the ram and jack assembly. The clear span of the panels was 48"×84". This was used to compute the load per square foot. Table I shows the results of these tests.

TABLE I
LOAD TESTS

| Panel Identification | Maximum Load Pounds | Area Square Feet | Load Pounds/ Square Feet |
|---|---|---|---|
| 1¼" Coating Both sides | 2,450 | 28.0 | 87.5 |
| 2¼" Coating Both Sides | 2,750 | 28.0 | 98.2 |
| 3¼" Coating Both Sides | 2,900 | 28.0 | 103.6 |
| 4¼" Coating Both Sides | 2,750 | 28.0 | 98.2 |

The compositions of this invention also were tested according to American Society of Testing Materials (ASTM) Standrd E-162 for Flame Retardation. For example, Formulation D, was tested to determine its effectiveness as a fire-retardant coating for mine timber and jute brattice, two widely used mine construction materials to determine the flame spread ratings of the various formulations tested.

The test result are given in Table II. They indicate that coatings of Formulation D are very effective in reducing the flame spread indexes of untreated jute brattice and Douglas fir to values of 25 or less. Hence, application of Formulation D to untreated jute brattice would result in such brattice meeting the requirements of CFR 30, Part 75.302-3. Formulation D would therefore also be effective treating timbers in the first 200 feet of a mine portal as required by Part 57.4-62 of CFR 30. The results of these flame retardancy tests are summarized in Table II.

TABLE II
FORMULATION D - FLAME RETARDANT COMPOSITION
Laboratory Tests: ASTM E-162 - Surface Flammability of Materials Using a Radiant Heat Energy Source
(samples not conditioned)

| Test | Material | Fs (Flame Spread Factor) | Q (Heat Evolution Factor) | Is (Flame Spread Index) |
|---|---|---|---|---|
| A | Untreated jute brattice | 61.55 | 5.33 | 328 |
| B1 | Jute brattice coated with Pyrochem D | 1.0 | | |
| B2 | Jute brattice coated with Pyrochem D | 1.0 | | |
| B3 | Jute brattice coated with Pyrochem D | 1.0 | | |
| B4 | Jute brattice coated with Pyrochem D | 1.0 | | |
| C1 | Douglas Fir (untreated) | 8.38 | 7.56 | 63.4 |
| C2 | Douglas Fir (untreated) | 9.12 | 8.89 | 81.1 |
| C3 | Douglas Fir (untreated) | 9.14 | 8.00 | 73.1 |
| C4 | Douglas Fir (untreated) | 7.06 | 8.00 | 56.5 |
| | | | | Average = 68.5 |
| D1 | Douglas Fir (one coat Pyrochem D) | 4.2 | .22 | 9.32 |
| D2 | Douglas Fir (one coat Pyrochem D) | 1.97 | 0.89 | 1.75 |
| D3 | Douglas Fir (one coat Pyrochem D) | 3.88 | 3.56 | 13.81 |
| D4 | Douglas Fir one coat Pyrochem D | 1.95 | 1.33 | 2.59 |
| | | | | Average = 6.9 |

Note: The above noted formulations also exceeded the requirements of ASTM Std. E-162 with the production of no more toxicity than those produced by cementitious sealants.

Further flame retardancy tests were conducted on Formulation C. The results of these tests can be summarized as follows.

TESTS USING MUFFLE FURNACE WITH TUNNEL

Test 1 = 1" thick Formulation "C"
Test 2 = 1½" thick Formulation "C"
Test 3 = 2" thick Formulation "C"
Test 4 = ⅛ thick aluminum plate
Test 5 = ½" thick Formulation "C"

Sample Freparation: 3⅞"×4" frames were made using marinite sides and ⅛" aluminum plate backs. The sample was placed in each frame so it filled the holder until it was flushwith the front. The samples were allowed to air dry at room temperature for up to 48 hours and then oven dried at 75° C. for 48 hours.

Before each test was run, the sample thickness was measured, because of shrinkage; the results are listed below:

| | Before Drying | After Drying |
|---|---|---|
| Test 1 | 1" | ¾" |
| Test 2 | 1½" | 1 3/16" |
| Test 3* | 2" | 1 11/16" |
| Test 4 | — | — |
| Test 5 | ½" | 7/16" |

*There was ⅛" shrinkage on two sides and 1/16" shrinkage on the other two sides of this sample.

Test Description: A frame with the sample was placed in the tunnel so that sample would be exposed to the furnace heat. The tunnel was placed in the opening of the muffle furaace. The temperature of the muffle furnace was set to 1500° F. and turned on. Thermocouples were used to measure the temperatures at different locations in the sample (see thermocouple locations for each sample below). The test was run for 100 minutes (40 minutes to bring the furnace up to temperature and 60 minutes at 1500° F.).

|  | Thermocouple Locations | | | | |
| --- | --- | --- | --- | --- | --- |
|  | Test 1 | Test 2 | Test 3 | Test 4 | Test 5 |
| Sample face | X | | | | |
| ½" into sample | X | | | — | — |
| 1" into sample | — | X | | — | — |
| 1½" into sample | — | — | X | — | — |
| Interface | X | | | — | X |
| Back of aluminum (out) | X | | | | |

Test Results:
Test 1: Smoke observed in tunnel 43 minutes into test. Face was dark gray in color at the end of the test. The dark gray penetrated into the sample about half way. The last half of the sample went from medium gray to light gray at the aluminum plate.
Test 2: Smoke observed in tunnel 18 minutes into test. Face was dark gray in color at the end of the test. The color penetration was dark gray at the face to medium gray at the middle. From the middle, the color changed to light gray and brown at the plate.
Test 3: Smoke observed in tunnel 26 minutes into test. Face was dark gray in color at the end of the test. The color penetration was the same as in Test 2.
Test 4: At 22 minutes into the test, the back side of the plate turned brown. At 35 minutes into the test, the temperature of the furnace was increased to 2000° F. At 38 minutes, the back surface had a dull orange glow. At 42 minutes, the top edge opened to about ⅛". At 43 minutes, the top left corner folded in toward the furnace. At 50 minutes, the furnace was shut-off.
Test 5: Smoke observed in tunnel 24 minutes into test. Face was dark gray in color at the end of the test. Sample was dark gray throughout.

Hence, taken together, these tests indicate that the formations of this patient disclosure make excellent mine sealants owing to their sprayablilty, reduced drying times, and flame retardant proprieties. It should also be appreciated by those skilled in this art that the specifications and examples set forth herein are given by way of illustration and not by way limitation. Hence various modifications and changes may be made in the herein disclosed formulations without departing from the spirit and scope of this invention which is to be limited solely by the scope of the appended claims.

Thus having disclosed this invention, what is claimed is:

1. A pre-mixed sprayable mine sealant composition comprised of, on a weight basis, from about 40 to about 95 percent sodium silicate, from about 0.05 to about 4.00 percent perlite, from about 0.005 to about 2.00 percent mineral acid.

2. The pre-mixed mine sealant composition of claim 1 which further comprises water in a concentration of from about 100 to about 50.00 percent by weight.

3. A pre-mixed sprayable mine sealant composition comprised of, on a weight basis, about 70 to about 84 percent sodium silicate, about 20.00 to about 24 percent water, about 0.2400 to about 2.800 percent perlite and about 0.009 to about 0.012 percent mineral acid.

4. A pre-mixed sprayable mine sealant composition comprised of, on a weight basis, from about 40 to about 90 percent sodium silicate, from about 0.05 to about 20.00 percent perlite, from about 0.005 to about 2.00 percent mineral acid, from about 1 to about 25 percent calcium carbonate, from about 0.1 to about 15.00 percent white pigment and from about 1.0 to about 10.00 percent cellulose.

5. The pre-mixed mine sealant composition of claim 4 which further comprises water in a concentration of from about 1 to about 50 percent by weight.

6. The pre-mixed mine sealant composition of claim 4 wherein the calcium carbonate is at least in part replaced by talc.

7. The pre-mixed composition of claim 4 wherein the white pigment is titanium dioxide.

8. A pre-mixed sprayable mine wall sealant composition comprised of, on a weight basis, about 61 to about 73 percent sodium silicate, about 20 to about 24 percent water, about 0.6 to about 0.5 percent perlite, about 0.009 to about 0.011 percent mineral acid, about 27.7 to about 3.4 percent calcium carbonate, about 0.7 to about 0.9 percent white pigment and about 4.7 to about 5.7 percent cellulose.

9. The pre-mixed mine sealant composition of claim 8 which further comprises water in a concentration of from about 1 to about 50 percent by weight.

10. The pre-mixed composition of claim 8 wherein the white pigment is titanium dioxide.

11. The pre-mixed composition of claim 8 wherein talc is substituted for calcium carbonate.

* * * * *